(12) United States Patent
Ogata et al.

(10) Patent No.: US 11,175,501 B2
(45) Date of Patent: Nov. 16, 2021

(54) DISPLAY DEVICE, METHOD FOR CONTROLLING DISPLAY DEVICE, AND MOVING BODY INCLUDING DISPLAY DEVICE

(71) Applicant: Panasonic Intellectual Property Management Co., Ltd., Osaka (JP)

(72) Inventors: Masahito Ogata, Osaka (JP); Toshiya Mori, Osaka (JP); Ken'ichi Kasazumi, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 16/469,188

(22) PCT Filed: Dec. 11, 2017

(86) PCT No.: PCT/JP2017/044302
§ 371 (c)(1),
(2) Date: Jun. 13, 2019

(87) PCT Pub. No.: WO2018/123527
PCT Pub. Date: Jul. 5, 2018

(65) Prior Publication Data
US 2019/0391392 A1    Dec. 26, 2019

(30) Foreign Application Priority Data
Dec. 27, 2016    (JP) .............................. JP2016-254532

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01);
(Continued)

(58) Field of Classification Search
CPC ............ B02B 27/0149; B02B 27/0101; B02B 2027/127; B02B 2027/0145;
(Continued)

(56) References Cited

U.S. PATENT DOCUMENTS 10,488,655 B2    11/2019    Kasazumi et al.
2009/0005961 A1    1/2009    Grabowski et al.
(Continued)

FOREIGN PATENT DOCUMENTS

EP    3299866 A1    3/2018
JP    2009-150947    7/2009
(Continued)

OTHER PUBLICATIONS

International Search Report of PCT application No. PCT/JP2017/044302 dated Feb. 20, 2018.
(Continued)

*Primary Examiner* — Brent D Castiaux
(74) *Attorney, Agent, or Firm* — Greenblum & Bernstein, P.L.C.

(57) ABSTRACT

A screen includes a surface inclined with respect to a reference plane. A driver moves the screen in a movement direction orthogonal to the reference plane. When forming a first virtual image serving as a virtual image on a first virtual plane whose inclination angle α with respect to an optical axis of a projector is smaller than a predetermined value, a controller is configured to hold the screen in the movement direction. When forming a second virtual image serving as the virtual image on a second virtual plane whose inclination angle ß with respect to the optical axis of the projector is
(Continued)

larger than the predetermined value, the controller is configured to move the screen in the movement direction.

9 Claims, 12 Drawing Sheets

(52) U.S. Cl.
CPC .............. *B60K 2370/1529* (2019.05); *G02B 2027/0127* (2013.01); *G02B 2027/0145* (2013.01); *G02B 2027/0152* (2013.01); *G02B 2027/0159* (2013.01)

(58) Field of Classification Search
CPC .... B02B 2027/0152; B02B 2027/0159; B02B 2027/0185; B02B 26/101; B60K 35/00; B60K 2370/1529; B60K 2370/334; B60K 2370/23; B60K 2370/179; H04N 13/30; G09G 5/00; G09G 5/377; G09G 5/38; B60R 11/02
See application file for complete search history.

(56) References Cited

U.S. PATENT DOCUMENTS

| | | | |
|---|---|---|---|
| 2009/0160736 A1* | 6/2009 | Kita | G02B 27/0101 345/7 |
| 2014/0375898 A1* | 12/2014 | Kurozuka | H04N 9/3135 348/760 |
| 2016/0070102 A1* | 3/2016 | Takamatsu | G02B 27/0101 359/631 |
| 2017/0115485 A1* | 4/2017 | Saito | B60K 35/00 |
| 2018/0113307 A1 | 4/2018 | Kasazumi et al. | |

FOREIGN PATENT DOCUMENTS

| | | | |
|---|---|---|---|
| JP | 2015197496 A | * | 11/2015 |
| JP | 2016064760 A | * | 4/2016 |
| JP | 2017-015954 | | 1/2017 |

OTHER PUBLICATIONS

German Office Action dated Apr. 7, 2021 for the related German Patent Application No. 112017006596.8.

\* cited by examiner

DISPLAY DEVICE, METHOD FOR CONTROLLING DISPLAY DEVICE, AND MOVING BODY INCLUDING DISPLAY DEVICE

CROSS-REFERENCE TO RELATED APPLICATIONS

This application is a U.S. national stage application of the PCT International Application No. PCT/JP2017/044302 filed on Dec. 11, 2017, which claims the benefit of foreign priority of Japanese patent application No. 2016-254532 filed on Dec. 27, 2016, the contents all of which are incorporated herein by reference.

TECHNICAL FIELD

The present disclosure generally relates to a display device, a method for controlling the display device, and a moving body including the display device, and more specifically relates to a display device that forms a virtual image in a target space with light transmitted through a screen, a method for controlling the display device, and a moving body including the display device.

BACKGROUND ART

Conventionally, as a vehicular display device, there has been a known vehicular head-up display device that remotely displays driving information image necessary for driving and other images as a virtual image through a windshield (for example, refer to PTL 1).

A display device described in PTL 1 includes a scanning unit for two-dimensionally scanning with light and a screen on which an image is drawn with scanning light from the scanning unit. The image formed on the screen is reflected by a windshield of a vehicle through a projection unit and reaches driver's eyes. Therefore, a driver visually recognizes a virtual image far ahead of the windshield with his or her eyes. According to the display device described in PTL 1, the screen is moved in a direction orthogonal to a surface of the screen. This can change a distance from the driver's eyes to the virtual image.

CITATION LIST

Patent Literature

PTL 1: Unexamined Japanese Patent Publication No. 2009-150947

SUMMARY OF THE INVENTION

The present disclosure provides a display device capable of reducing a movement range of a screen, a method for controlling the display device, and a moving body including the display device.

A display device of a first aspect includes a screen, a drive unit, an irradiation unit, a projection unit, and a controller. The screen includes a surface inclined with respect to a reference plane. The drive unit moves the screen in a movement direction orthogonal to the reference plane. The irradiation unit irradiates the screen with light used for scanning the surface of the screen. The projection unit receives light that is transmitted through the screen and is output from the screen along a movement direction as incident light, and projects the incident light onto a reflective member to be reflected, thereby forming a virtual image in a target space. The controller controls the drive unit and the irradiation unit. When forming a first virtual image serving as the virtual image on a first virtual plane whose inclination angle with respect to an optical axis of the projection unit is smaller than a predetermined value, the controller is configured to hold the screen in the movement direction. When forming a second virtual image serving as the virtual image on a second virtual plane whose inclination angle with respect to the optical axis of the projection unit is larger than the predetermined value, the controller is configured to move the screen in the movement direction.

In the display device of a second aspect according to the first aspect, the screen further includes a first end part and a second end part at both ends of the surface in a direction inclined with respect to the reference plane. The screen is configured such that, when the first end part is irradiated with the light of the irradiation unit, an optical path length from a drawing point on the first virtual image to the projection unit is maximized. The screen is configured such that, when the second end part is irradiated with the light of the irradiation unit, the optical path length from the drawing point on the first virtual image to the projection unit is minimized.

In the display device of a third aspect according to the first or second aspect, the screen further includes the first end part and the second end part at both ends of the surface in the direction inclined with respect to the reference plane. An operation state of the irradiation unit includes a first scanning state that scans the surface of the screen from the first end part toward the second end part, and a second scanning state that scans the surface of the screen from the second end part toward the first end part. The controller is configured to synchronize an operation of the drive unit with an operation of the irradiation unit, to form the first virtual image or the second virtual image in only either the first scanning state or the second scanning state.

In the display device of a fourth aspect according to any one of the first to third aspects, the scanning range of the irradiation unit on the surface of the screen in the longitudinal direction inclined with respect to the reference plane is narrower when the second virtual image is formed than when the first virtual image is formed.

A method for controlling the display device of a fifth aspect is a method for controlling a display device including a screen, a drive unit, an irradiation unit, a projection unit, and a controller. The screen includes a surface inclined with respect to a reference plane. The drive unit moves the screen in a movement direction orthogonal to the reference plane. The irradiation unit irradiates the screen with light used for scanning the surface of the screen. The projection unit receives light that is transmitted through the screen and is output from the screen along the movement direction as incident light, and forms a virtual image in a target space by the incident light. The method for controlling the display device includes a first process and a second process. The first process is a process for forming a first virtual image serving as the virtual image on a first virtual plane whose inclination angle with respect to an optical axis of the projection unit is smaller than a predetermined value. The second process is a process for forming a second virtual image serving as the virtual image on a second virtual plane whose inclination angle with respect to the optical axis of the projection unit is larger than the predetermined value. In the first process, the screen is held in the movement direction, and in the second process, the screen is moved in the movement direction.

A moving body of a sixth aspect includes the display device according to any one of the first to fourth aspects and the reflective member that reflects light from the projection unit.

The present disclosure provides an advantage in which a movement range of a screen can be reduced.

DESCRIPTION OF EMBODIMENTS

Prior to describing exemplary embodiments of the present disclosure, problems found in a conventional technology will briefly be described. In the display device described in PTL 1, an adjusting width of a distance from eyes of a person (driver) to a virtual image is determined according to a moving distance of a screen. This requires a wider moving range of the screen to obtain a wider adjusting width of the distance from the eyes of the person to the virtual image. This wider moving range of the screen may causes problems such as an increase in size of an actuator for moving the screen, an increase in power consumption of the actuator, and noise due to an operating sound of the actuator.

First Exemplary Embodiment (1) Outline

Figure 1:
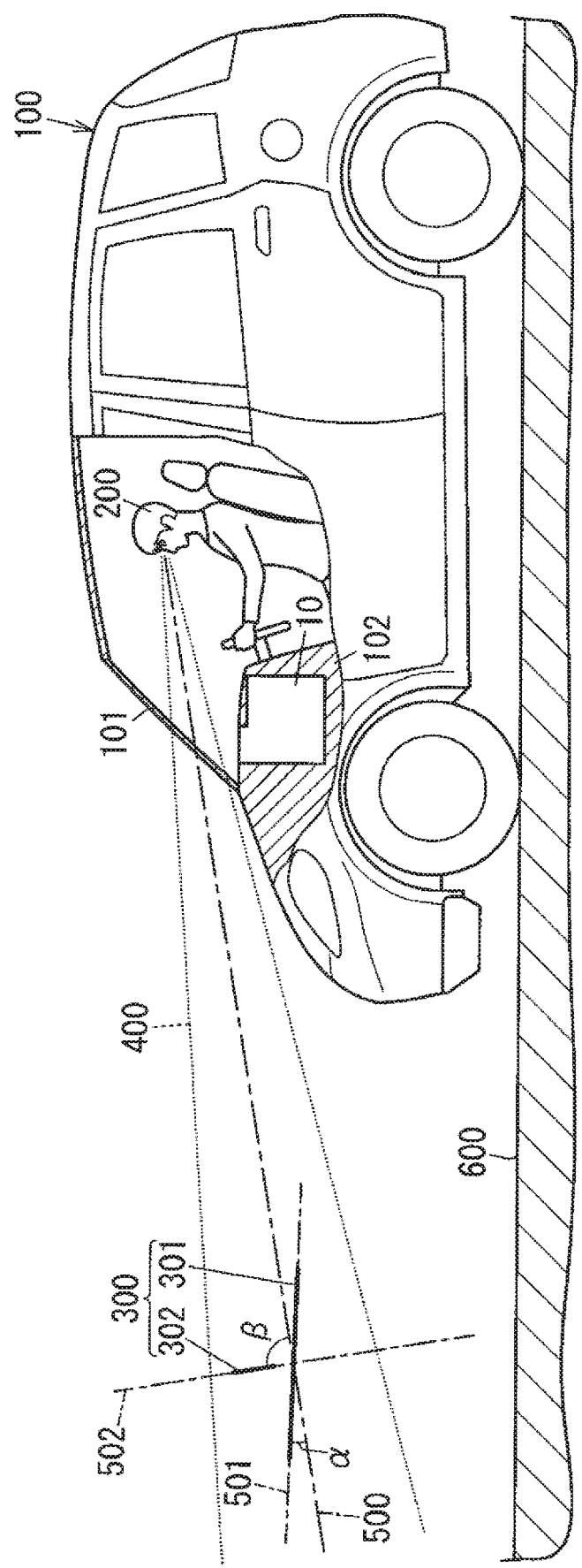
FIG. 1 is a conceptual diagram illustrating a vehicle including a display device according to a first exemplary embodiment.

As illustrated in FIG. 1, display device 10 according to the present exemplary embodiment is a head-up display (HUD) used for vehicle 100 serving as a moving body, for example.

Figure 12:
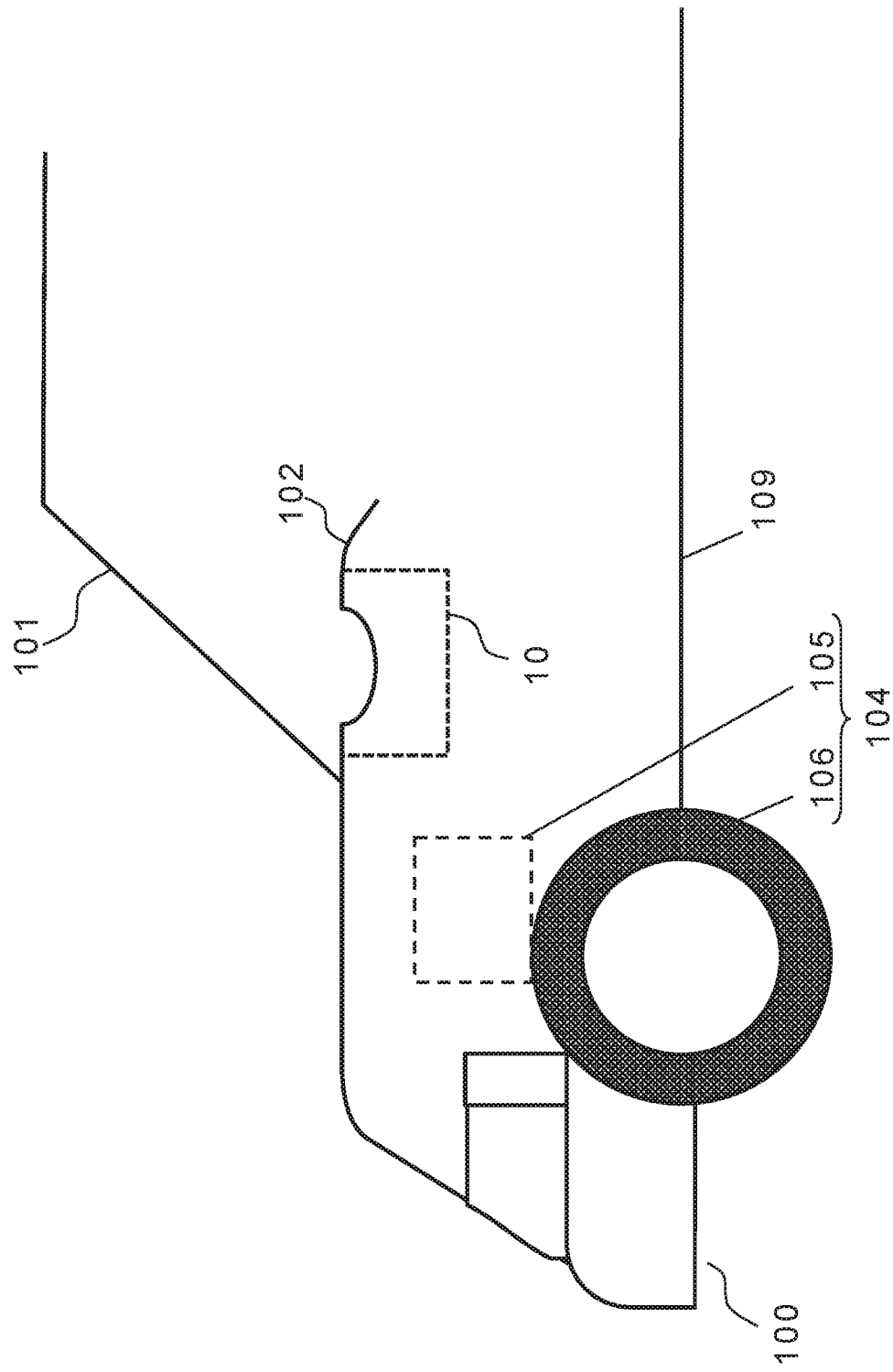
FIG. 12 is a conceptual diagram of the vehicle including the display device according to the first exemplary embodiment.

As illustrated in FIG. 12, vehicle 100 includes body 109, vehicle drive unit 104 that moves body 109, windshield 101 held to body 109, and display device 10 disposed in dashboard 102 of body 109. Vehicle drive unit 104 includes driving source 105 such as an engine or a motor, and driving wheel 106 driven by driving source 105.

As illustrated in FIG. 1, display device 10 is disposed in a cabin of vehicle 100 so as to project an image onto windshield 101 of vehicle 100 from below. In an example of FIG. 1, display device 10 is disposed in dashboard 102 below windshield 101. When the image is projected from display device 10 onto windshield 101, user 200 (driver) visually recognizes the image reflected by windshield 101 serving as a reflective member.

According to display device 10, user 200 visually recognizes virtual image 300 formed in target space 400 set ahead of vehicle 100 (outside of the vehicle) through windshield 101. Target space 400 is a space present ahead of windshield 101 (toward a direction deeper than windshield 101). The "virtual image" mentioned herein means an image formed by diverging light as if an object were actually present when the light emitted from display device 10 is diverged by a reflector such as windshield 101. Therefore, user 200 who drives vehicle 100 can view virtual image 300, which is formed by display device 10, while superimposing virtual image 300 on a real space spreading in front of vehicle 100. Hence, display device 10, can display various pieces of driving assistance information as virtual image 300 such as vehicle speed information, navigation information, pedestrian information, front vehicle information, lane departure information, and vehicle condition information, and can cause user 200 to visually recognize the various pieces of driving assistance information. Accordingly, user 200 can visually acquire the driving assistance information only by slightly moving his or her line of sight from the state of being directed to the front of windshield 101.

In display device 10 according to the present exemplary embodiment, virtual image 300 formed in target space 400 includes at least two types of virtual images, which are first virtual image 301 and second virtual image 302. The "first virtual image" mentioned herein is virtual image 300 (301) formed on first virtual plane 501. The "first virtual plane" is a virtual plane whose inclination angle α with respect to optical axis 500 of display device 10 is smaller than predetermined value γ (α<γ). Moreover, the "second virtual image" mentioned herein is virtual image 300 (302) formed on second virtual plane 502. The "second virtual plane" is a virtual plane whose inclination angle ß with respect to optical axis 500 of display device 10 is larger than predetermined value γ (ß>γ). The "optical axis" mentioned herein is an optical axis of an optical system of projection unit 4 (refer to FIG. 3) to be described later, that is, an axis that passes through a center of target space 400 and goes along an optical path of virtual image 300. An example of predetermined value γ is 45 degrees, and an example of inclination angle ß is 90 degrees.

In the present exemplary embodiment, optical axis 500 extends along road surface 600 in front of vehicle 100 in target space 400 in front of vehicle 100. First virtual image 301 is formed on first virtual plane 501 substantially parallel to road surface 600, and second virtual image 302 is formed on second virtual plane 502 substantially perpendicular to road surface 600. For example, when road surface 600 is a horizontal plane, first virtual image 301 is displayed along the horizontal plane, and second virtual image 302 is displayed along a vertical plane.

Figure 2:
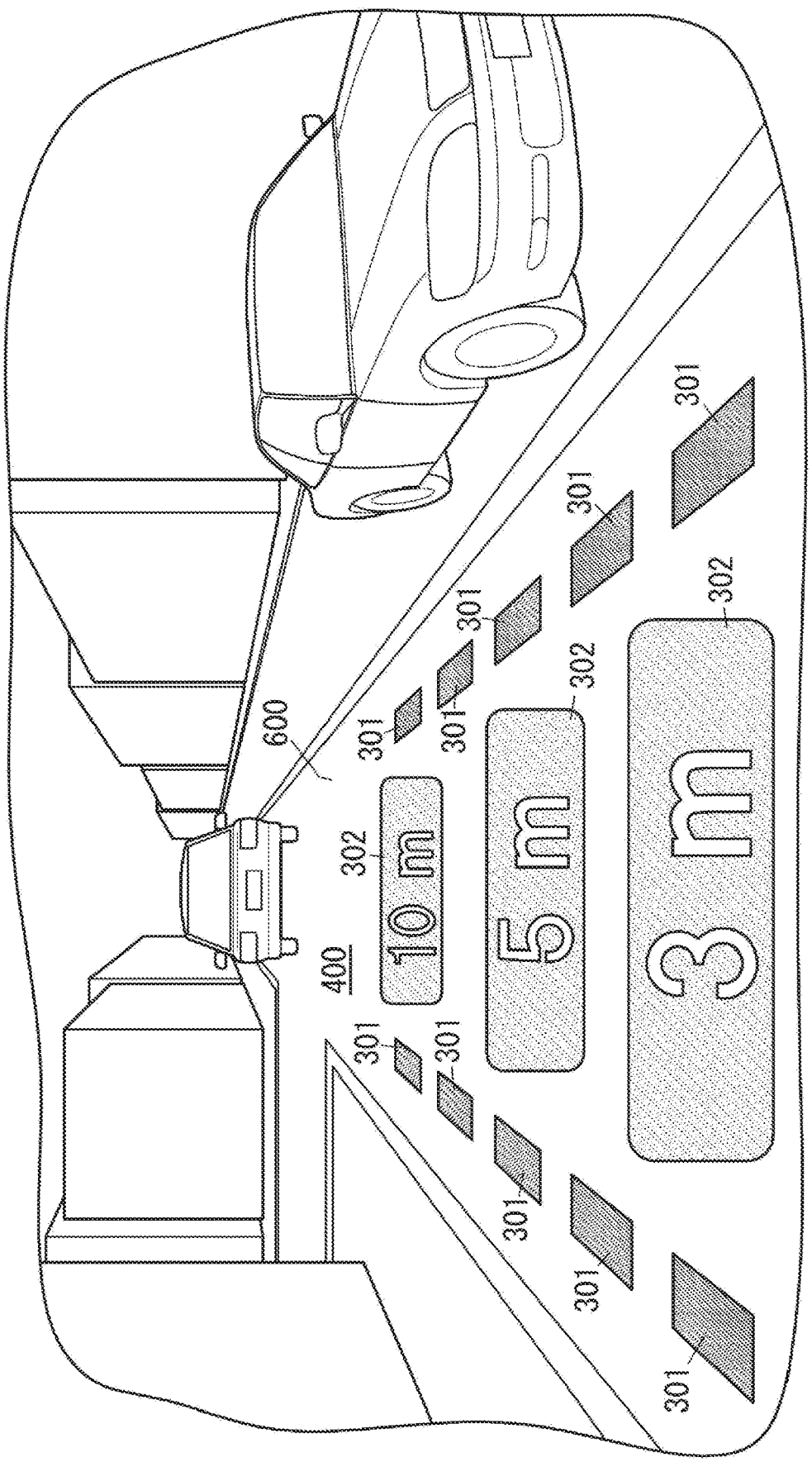
FIG. 2 is a conceptual diagram illustrating a view field of a user when the display device is used.

FIG. 2 is a conceptual diagram illustrating a visual field of user 200. In other words, as illustrated in FIG. 2, display device 10 according to the present exemplary embodiment is capable of displaying first virtual image 301 viewed with depth along road surface 600 and second virtual image 302 viewed upright on road surface 600 at a certain distance from user 200. Hence, for user 200, first virtual image 301 looks like being present on a plane substantially parallel to road surface 600, and second virtual image 302 looks like being present on a plane substantially perpendicular to road surface 600. An example of first virtual image 301 is navigation information indicating a traveling direction of vehicle 100, which can present an arrow that indicates a right turn or a left turn on road surface 600. An example of second virtual image 302 is information indicating a distance to a front vehicle or a pedestrian, which can present a distance to the front vehicle (inter-vehicle distance) on the front vehicle.

(2) Configuration

Figure 3:
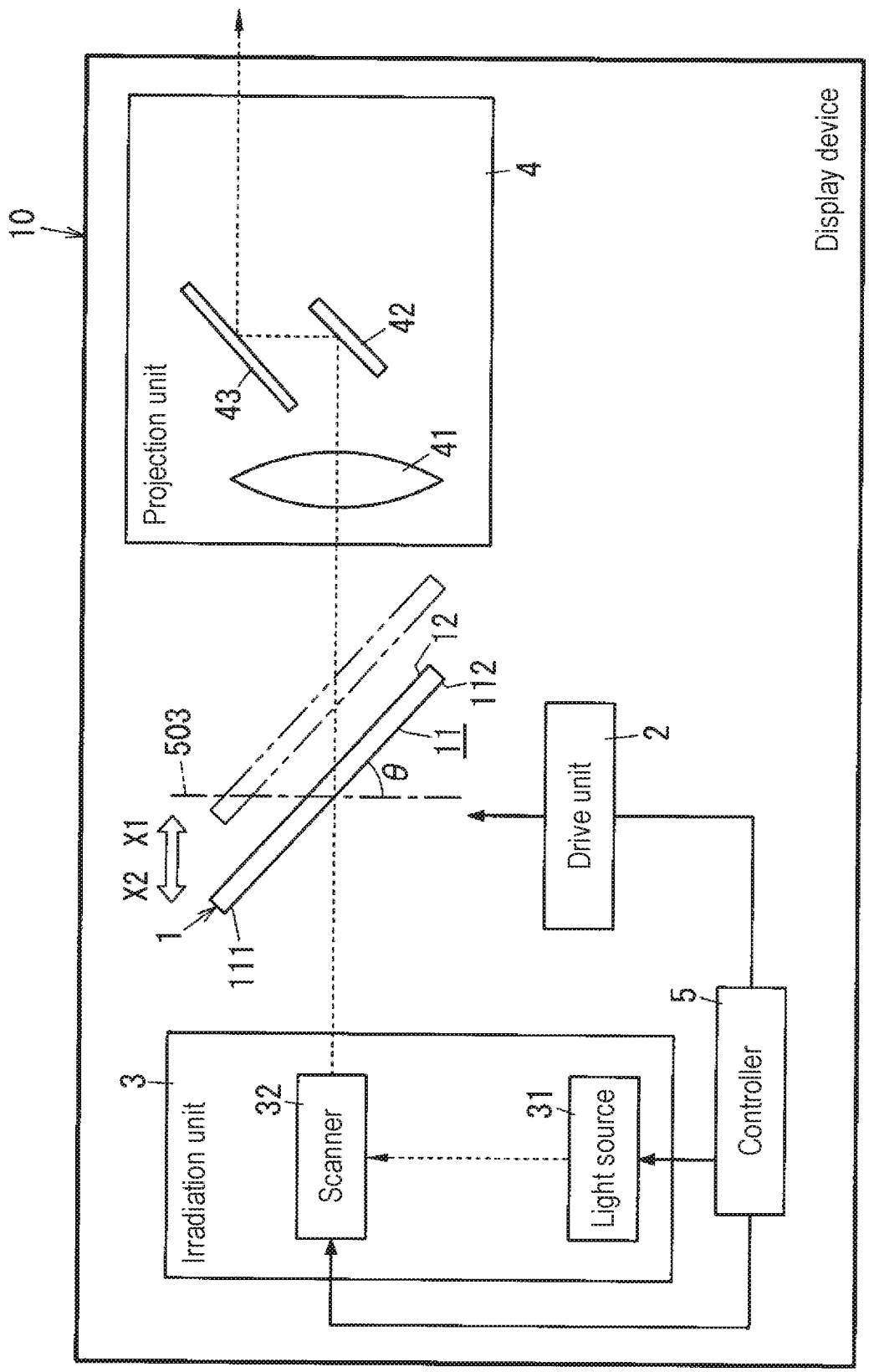
FIG. 3 is a conceptual diagram illustrating a configuration of the display device.

As illustrated in FIG. 3, display device 10 according to the present exemplary embodiment includes screen 1, drive unit (driver) 2, irradiation unit (irradiator) 3, projection unit (projector) 4, and controller 5.

Screen 1 has translucency and forms an image to form virtual image 300 (refer to FIG. 1) in target space 400 (refer to FIG. 1). In other words, the image is drawn by the light from irradiation unit 3 on screen 1, and virtual image 300 is formed in target space 400 by the light transmitted through screen 1. Screen 1 is formed of a rectangular plate-shaped member with light-diffusing property, for example. Screen 1 includes front surface 11 and rear surface 12 on both surfaces of screen 1 in a thickness direction. In the present exemplary embodiment, as an example, front surface 11 of screen 1 has the light-diffusing property with a large number of fine lenses being formed on front surface 11 of screen 1. Screen 1 is disposed between irradiation unit 3 and projection unit 4 with a posture directing front surface 11 toward irradiation unit 3, and front surface 11 is defined as an incident surface on which light from irradiation unit 3 is incident.

Front surface 11 of screen 1 is inclined at angle θ with respect to reference plane 503. Furthermore, screen 1 is configured to be movable in movement direction X orthogonal to reference plane 503 (a direction indicated by arrow X1-X2 in FIG. 3). The "reference plane" mentioned herein is not a real plane but a virtual flat plane that defines the movement direction of screen 1. Screen 1 is configured to be movable rectilinearly in movement direction X while maintaining a posture of front surface 11 inclined at angle θ with respect to reference plane 503. Screen 1 further includes first end part 111 and second end part 112 at both ends of front surface 11 in a direction inclined with respect to reference plane 503 (a direction parallel to front surface 11 on a paper plane of FIG. 3). A direction connecting first end part 111 and second end part 112 along front surface 11 of screen 1 is also referred to as a "longitudinal direction". First end part 111 is an end part closest to irradiation unit 3 on front surface 11, and second end part 112 is an end part farthest from irradiation unit 3 on front surface 11. In other words, in the longitudinal direction, a portion of screen 1 closer to first end part 111 is located closer to irradiation unit 3, and a portion of screen 1 closer to second end part 112 is located farther from irradiation unit 3.

Drive unit 2 moves screen 1 in movement direction X. Herein, drive unit 2 can move screen 1 along movement direction X in both first direction X1 and second direction X2 opposite to each other. First direction X1 is a direction indicated by arrow "X1" (a right direction in FIG. 3), which is a direction in which screen 1 separates from irradiation unit 3, that is, a direction in which screen 1 approaches projection unit 4. Second direction X2 is a direction indicated by arrow "X2" (a left direction in FIG. 3), which is a direction in which screen 1 approaches irradiation unit 3, that is, a direction in which screen 1 separates from projection unit 4. For example, drive unit 2 is an electric-driven actuator such as a voice coil motor, and operates according to a first control signal from controller 5.

Irradiation unit 3 is a scanning-type light irradiation unit, and irradiates screen 1 with light. In other words, irradiation unit 3 irradiates screen 1 with light used for scanning front surface 11 of screen 1 so as to change an irradiation position of light on front surface 11 of screen 1. Specifically, irradiation unit 3 includes light source 31 and scanner 32. In irradiation unit 3, each of light source 31 and scanner 32 operates according to a second control signal from controller 5.

Light source 31 is formed of a laser module that outputs laser light. Light source 31 includes a red laser diode that emits a laser light beam of a red color (R), a green laser diode that emits a laser light beam of a green color (G), and a blue laser diode that emits a laser light beam of a blue color (B). Three color laser light beams output from these three kinds of laser diodes are synthesized by, for example, a dichroic mirror, and incident on scanner 32.

Scanner 32 performs scanning with the light from light source 31 to irradiate screen 1 with light used for scanning front surface 11 of screen 1. Herein, scanner 32 performs raster-scanning in which light is two-dimensionally scanned in longitudinal and lateral directions of front surface 11 of screen 1. The "lateral direction" mentioned herein is a direction parallel to both front surface 11 of screen 1 and reference plane 503, and is a direction orthogonal to the "longitudinal direction" on front surface 11 (a direction orthogonal to the paper plane of FIG. 3).

Figure 4A:
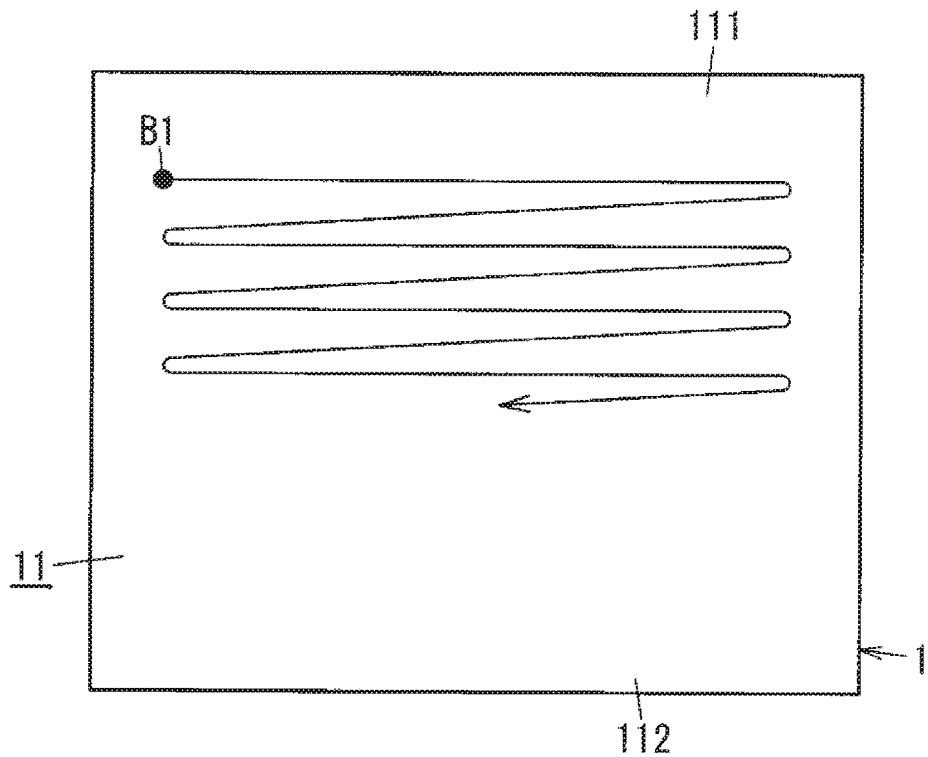
FIG. 4A is a conceptual diagram illustrating movement of a luminescent spot on a front surface of a screen in an outward path in the display device.
Figure 4B:
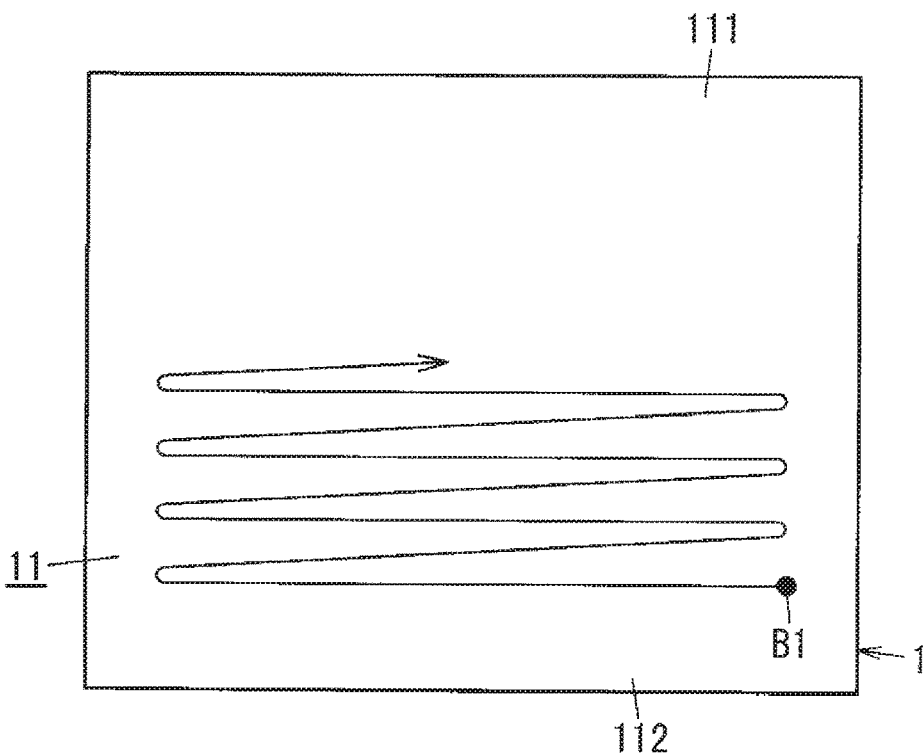
FIG. 4B is a conceptual diagram illustrating the movement of the luminescent spot on the front surface of the screen in a return path in the display device.

In scanner 32, as illustrated in FIGS. 4A and 4B, luminescent spot B1 formed on front surface 11 of screen 1 is one-dimensionally scanned along the lateral direction to form a scan line, and luminescent spot B1 is scanned along the longitudinal direction to form a two-dimensional image. Scanner 32 performs scanning with luminescent spot B1 such that luminescent spot B1 reciprocates between the both ends (first end part 111 and second end part 112) of front surface 11 in the longitudinal direction while repeating the above-described operations. FIG. 4A is a diagram conceptually illustrating movement of luminescent spot B1 on front surface 11 of screen 1, in an "outward path" that scans from first end part 111 toward second end part 112. FIG. 4B is a diagram conceptually illustrating the movement of luminescent spot B1 on front surface 11 of screen 1, in a "return path" that scans from second end part 112 toward first end part 111.

In other words, in the present exemplary embodiment, an operation state of irradiation unit 3 includes a first scanning state serving as the "outward path" and a second canning state serving as the "return path". The first scanning state is an operation state in which front surface 11 of screen 1 is scanned from first end part 111 toward second end part 112. The second scanning state is an operation state in which front surface 11 of screen 1 is scanned from second end part 112 toward first end part 111.

Figure 5:
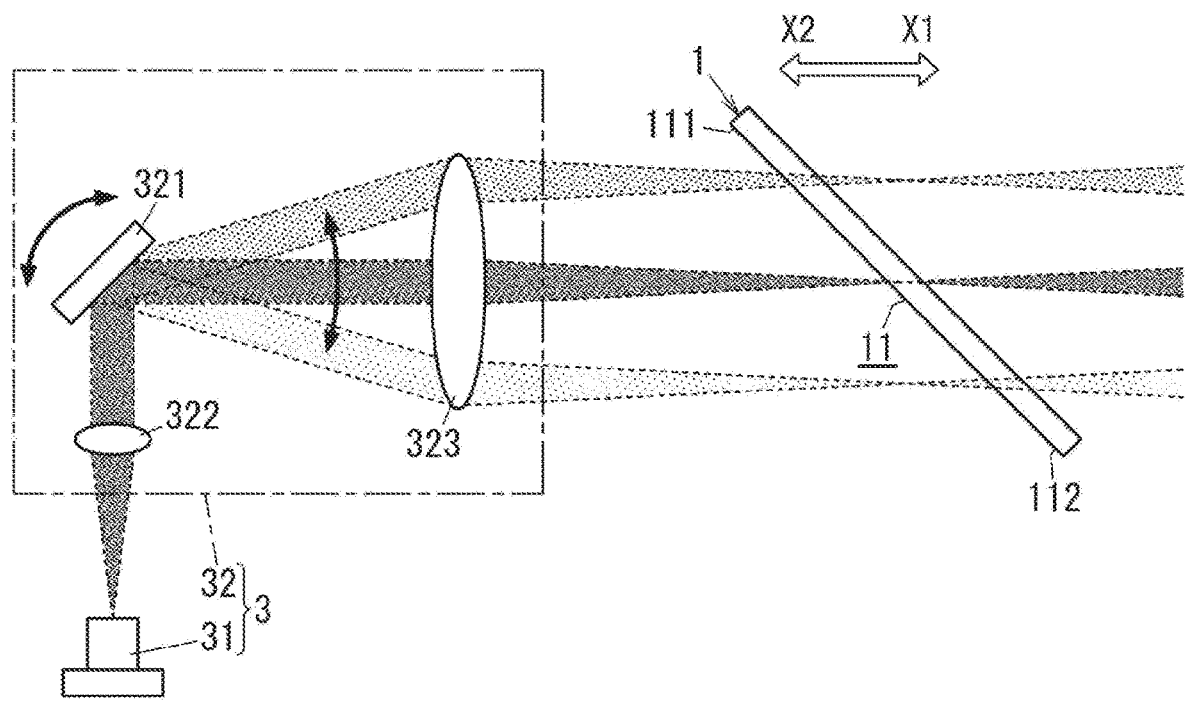
FIG. 5 is a conceptual diagram illustrating a configuration of an irradiation unit in the display device.

Scanner 32 includes a small scanning mirror using a micro electro mechanical systems (MEMS) technology, for example. As illustrated in FIG. 5, scanner 32 includes mirror unit 321 that reflects the laser light, and rotates mirror unit 321 to reflect the light from light source 31 in a direction according to a rotation angle (deflection angle) of mirror unit 321. This allows scanner 32 to scan screen 1 with the light from light source 31. Scanner 32 rotates mirror unit 321 around two axes orthogonal to each other to achieve the raster-scanning that performs two-dimensional scanning with light.

Scanner 32 further includes first lens 322 and second lens 323. First lens 322 is disposed between light source 31 and mirror unit 321, and causes parallel light to enter mirror 321. Second lens 323 is formed from a telecentric lens, and is disposed between mirror unit 321 and screen 1. In other words, second lens 323 is an optical system whose primary optical ray is made parallel to an optical axis over the entire lens. Light passing through second lens 323 is output parallel to the optical axis (a straight line connecting second lens 323 and screen 1). FIG. 5 is merely a schematic diagram to describe a configuration of irradiation unit 3, and is different from display device 10 according to the present exemplary embodiment in some points, for example, a focal point of the light emitted from irradiation unit 3 is located at a position largely shifted from front surface 11 of screen 1.

Projection unit 4 receives light that is output from irradiation unit 3 and is transmitted through screen 1 as incident light, and projects the incident light onto windshield 101 (refer to FIG. 1) to be reflected, thereby forming virtual image 300 (refer to FIG. 1) in target space 400 (refer to FIG. 1). Herein, projection unit 4 is disposed so as to align with screen 1 in movement direction X, and projects virtual image 300 with the light that is transmitted through screen 1 and is output from screen 1 along movement direction X. Projection unit 4 includes magnifying lens 41, first mirror 42, and second mirror 43, as illustrated in FIG. 3.

Magnifying lens 41, first mirror 42, and second mirror 43 are disposed in this order on a path of the light transmitted through screen 1. Magnifying lens 41 is disposed on an opposite side (toward first direction X1) of screen 1 from irradiation unit 3 in movement direction X so as to receive the light output from screen 1 along movement direction X. Magnifying lens 41 magnifies image 700 (refer to FIG. 7) formed on screen 1 with the light from irradiation unit 3 to output the magnified image to first mirror 42. First mirror 42 reflects the light from magnifying lens 41 toward second mirror 43. Second mirror 43 reflects the light from first mirror 42 toward windshield 101 (refer to FIG. 1). In other words, projection unit 4 magnifies, with magnifying lens 41, image 700 formed on screen 1 with the light from irradiation unit 3, and projects the magnified image onto windshield 101, thereby projecting forming virtual image 300 in target space 400. An optical axis of magnifying lens 41 corresponds to optical axis 500 of projection unit 4.

Controller 5 controls drive unit 2 and irradiation unit 3. Controller 5 controls drive unit 2 with the first control signal and controls irradiation unit 3 with the second control signal. Although details will be described later, controller 5 is configured to synchronize an operation of drive unit 2 with an operation of irradiation unit 3. In the present exemplary embodiment, irradiation unit 3 includes light source 31 and scanner 32. Controller 5 controls both light source 31 and scanner 32 with the second control signal. Controller 5 is composed of a microcomputer mainly including, for example, a central processing unit (CPU) and a memory. In other words, controller 5 is implemented by a computer including the CPU and the memory. The CPU executes a program stored in the memory, allowing the computer to function as controller 5. Herein, the program is recorded in the memory of controller 5 in advance. However, the program may be provided via a telecommunication line such as the Internet or by being recorded in a recording medium such as a memory card.

(3) Operation (3.1) Basic Operation

Figure 6:
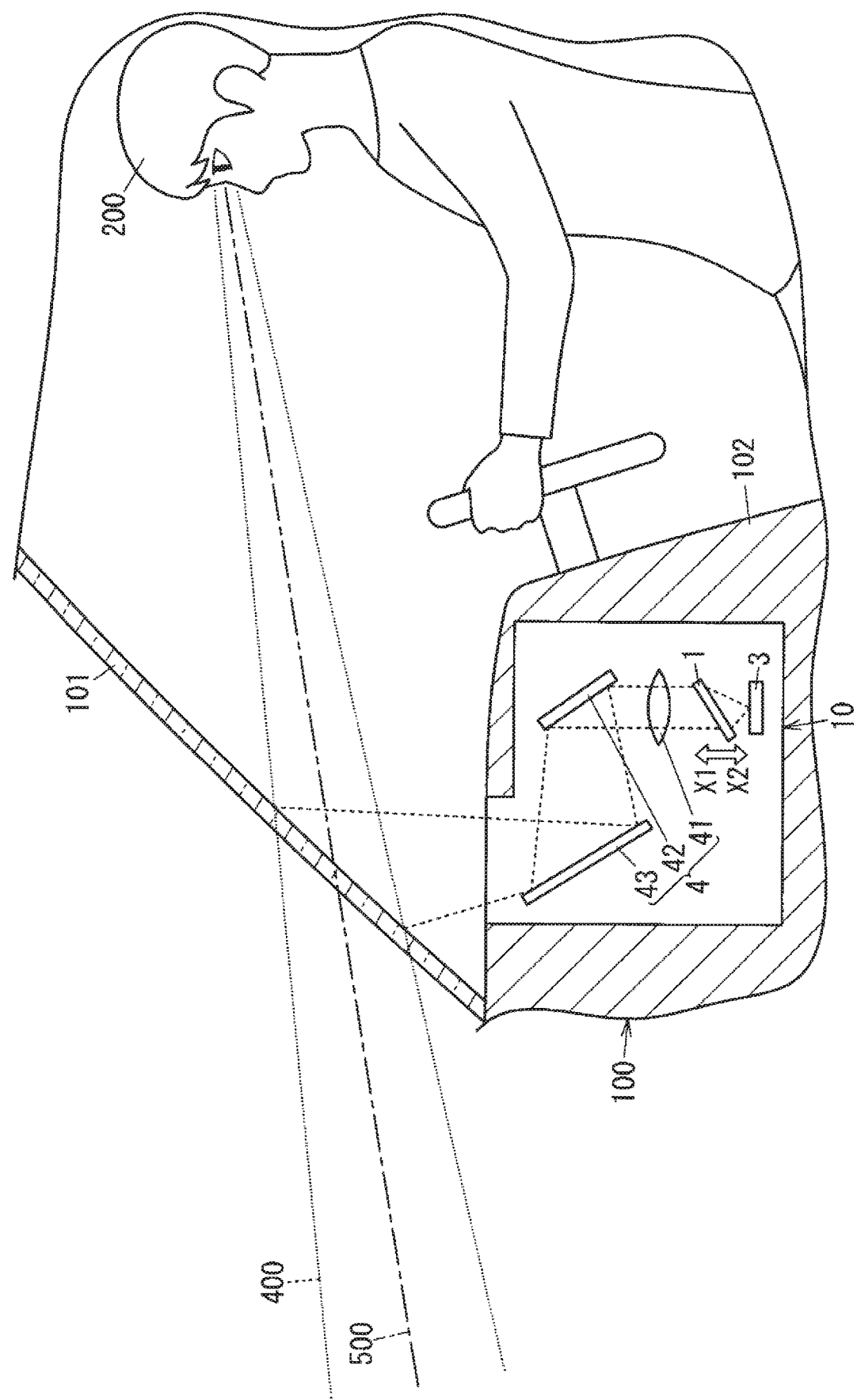
FIG. 6 is a conceptual diagram for explaining an operation of the display device.

A basic operation of display device 10 according to the present exemplary embodiment will now be described herein with reference to FIG. 6.

Controller 5 controls irradiation unit 3 to cause irradiation unit 3 to irradiate screen 1 with light. At this moment, irradiation unit 3 irradiates screen 1 with light used for scanning front surface 11 of screen 1. With this configuration, image 700 (refer to FIG. 7) is formed (projected) on front surface 11 or rear surface 12 of screen 1. In the present exemplary embodiment, as an example, front surface 11 of screen 1 has the light-diffusing property, thereby forming image 700 on front surface 11 of screen 1. Furthermore, the light from irradiation unit 3 is transmitted through screen 1, and projection unit 4 (magnifying lens 41, first mirror 42, and second mirror 43) irradiates windshield 101 with the light from irradiation unit 3. In this manner, image 700 formed on screen 1 is projected onto windshield 101 from below windshield 101 in the cabin of vehicle 100.

When image 700 is projected from projection unit 4 onto windshield 101, windshield 101 reflects the light from projection unit 4 toward user 200 (driver) in the cabin. This allows user 200 to visually recognize image 700 reflected by windshield 101. As a result, user 200 visually recognizes virtual image 300 formed in front of vehicle 100 (outside of the vehicle), through windshield 101.

In addition, controller 5 controls drive unit 2 to allow screen 1 to move in movement direction X. In a case where an irradiation position on front surface 11 of screen 1 on which the light is emitted from irradiation unit 3, that is, a position of luminescent spot B1 is constant, when screen 1 moves toward first direction X1, a distance from eyes (eye point) of user 200 to virtual image 300 (hereinafter, also referred to as a "viewing distance") becomes shorter (closer). In contrast, in the case where the position of luminescent spot B1 on front surface 11 of screen 1 is constant, when screen 1 moves toward second direction X2, the viewing distance to virtual image 300 becomes longer (farther). In short, the viewing distance to virtual image 300 changes according to a position of screen 1 in movement direction X. With screen 1 being closer to irradiation unit 3, the viewing distance to virtual image 300 projected corresponding to luminescent spot B1 on screen 1 becomes longer. In other words, with the irradiation position of the light from irradiation unit 3 on screen 1 becoming farther from projection unit 4 in movement direction X, the viewing distance to virtual image 300 projected formed by this light becomes longer.

(3.2) Specific Operation

Figure 7:
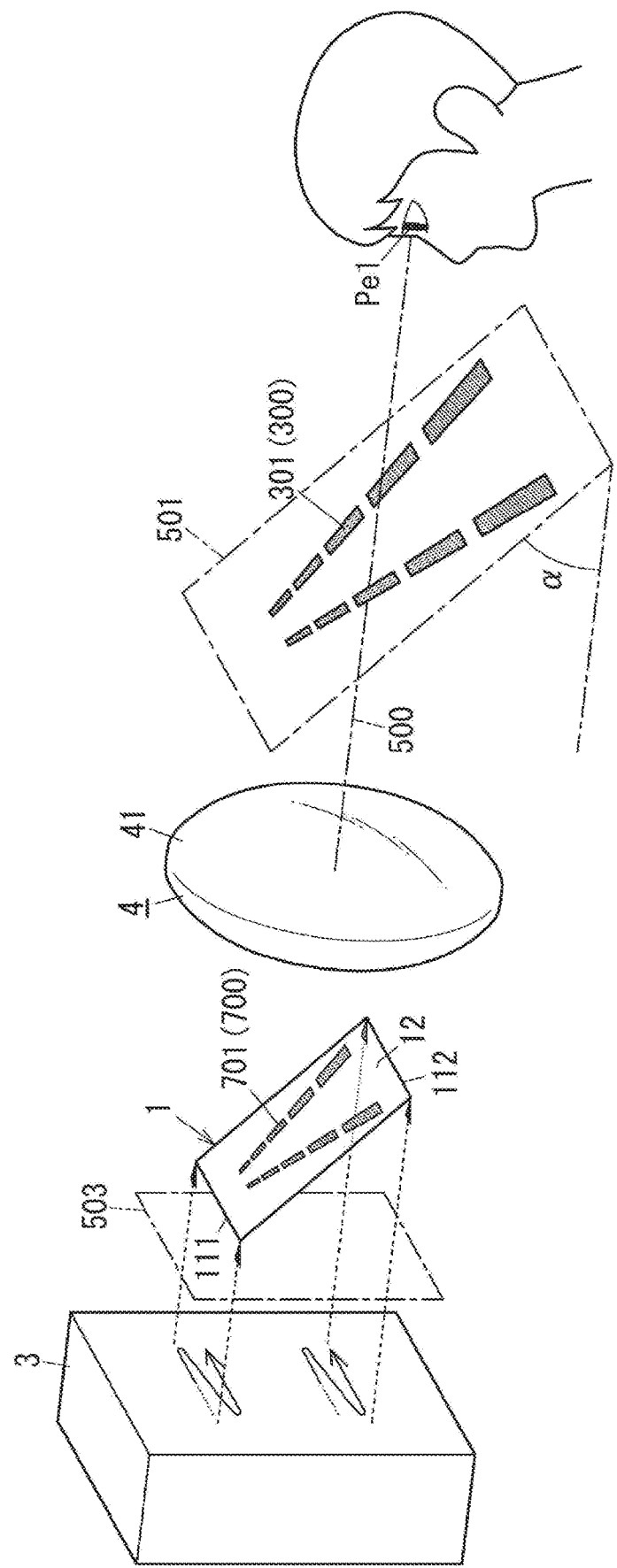
FIG. 7 is an explanatory diagram schematically illustrating an operation for projecting a first virtual image in the display device.
Figure 8:
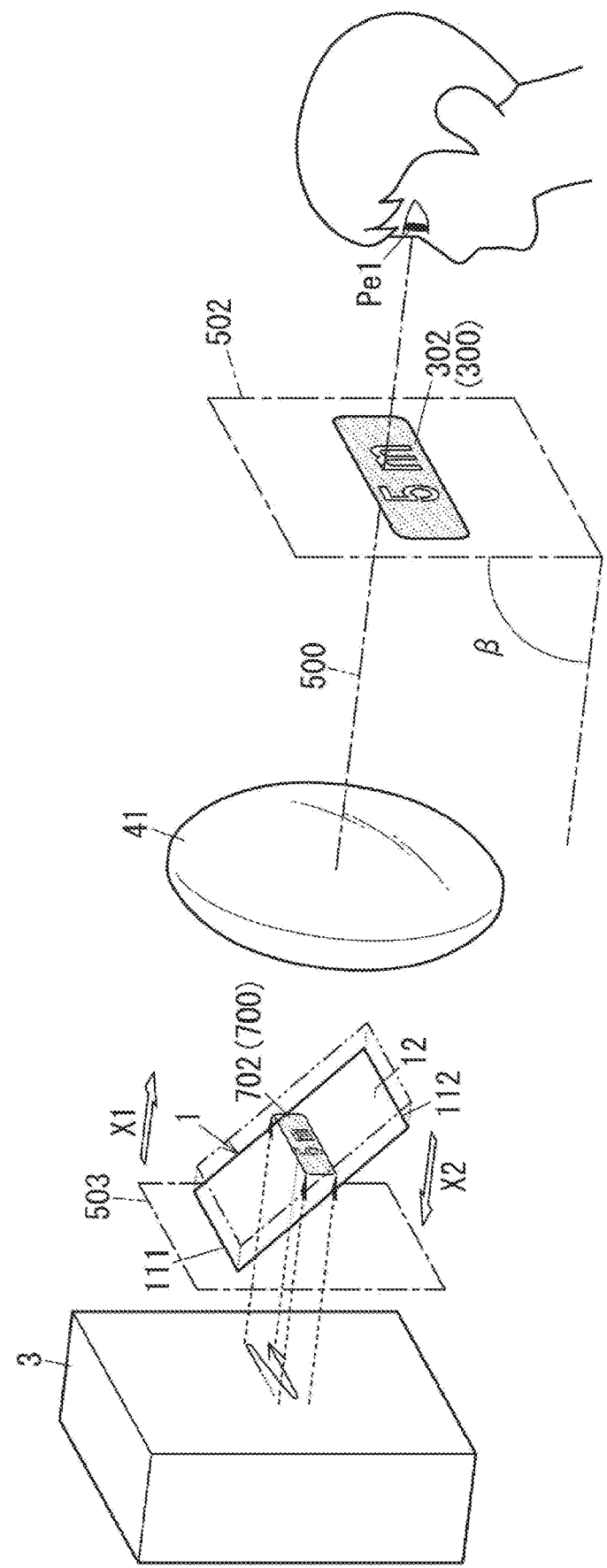
FIG. 8 is an explanatory diagram schematically illustrating an operation for projecting a second virtual image in the display device.

A specific operation of display device 10 according to the present exemplary embodiment will now be described herein with reference to FIGS. 7 to 10B. FIG. 7 is a schematic diagram illustrating an operation of display device 10 for projecting first virtual image 301. FIG. 8 is a schematic diagram illustrating an operation of display device 10 for projecting second virtual image 302.

When first virtual image 301 is projected, as illustrated in FIG. 7, controller 5 holds screen 1 in movement direction X (a direction indicated by arrow X1-X2 in FIG. 6), without moving screen 1 in movement direction X. In other words, controller 5 controls drive unit 2 and irradiation unit 3 such that irradiation unit 3 irradiates screen 1 located at a hold position with light. Since screen 1 is originally inclined with respect to movement direction X, even when screen 1 is located at the hold position, a difference in distance to projection unit 4 in movement direction X occurs depending on a position on front surface 11 of screen 1 in the longitudinal direction. Therefore, even when screen 1 is held, when the irradiation position of the light from irradiation unit 3 on front surface 11 of screen 1 changes in the longitudinal direction, the irradiation position of the light from irradiation unit 3 on front surface 11 of screen 1 changes in movement direction X. Accordingly, first image 701 is formed (projected) on screen 1. The "first image" mentioned herein is image 700 formed on front surface 11 or rear surface 12 of screen 1, which is formed along front surface 11 of careen 1, that is, is inclined with respect to reference plane 503. When first image 701 is projected onto windshield 101 from projection unit 4, user 200 visually recognizes first virtual image 301 formed in front of vehicle 100 through windshield 101.

For example, when the irradiation position of the light from irradiation unit 3 on front surface 11 of screen 1 becomes closer to first end part 111 in the longitudinal direction, the distance from projection unit 4 to the irradiation position in movement direction X becomes longer, whereby the viewing distance to virtual image 300 projected by this light becomes longer. In contrast, when the irradiation position of the light from irradiation unit 3 on front surface 11 of screen 1 becomes closer to second end part 112 in the longitudinal direction, the distance from projection unit 4 to the irradiation position in movement direction X becomes shorter, whereby the viewing distance to virtual image 300 projected by this light becomes shorter. With this configuration, first virtual image 301 serving as virtual image 300 is formed on first virtual plane 501 inclined at inclination angle α with respect to optical axis 500.

Accordingly, when irradiation unit 3 scans hold screen 1 with light from first end part 111 toward second end part 112, for example, first virtual image 301 that is visually recognized by user 200 with depth along road surface 600 is formed. As illustrated in FIG. 7, the viewing distance from eye point Pe1 to first virtual image 301 formed at this time becomes larger on a side closer to first end part 111 (a side closer to an upper end) in screen 1 than on a side closer to second end part 112 (a side closer to a lower end) in screen 1. In other words, screen 1 is configured such that, when first end part 111 is irradiated with the light of irradiation unit 3, an optical path length from a drawing point on first virtual image 301 to projection unit 4 is maximized. Screen 1 is configured such that, when second end part 112 is irradiated with the light of irradiation unit 3, the optical path length from the drawing point on first virtual image 301 to projection unit 4 is minimized. In other words, first virtual image 301 is designed to be a virtual image inclined with respect to optical axis 500 such that the viewing distance is maximized on the upper end side in a vertical direction (a vertical direction in FIG. 2) when viewed from user 200.

On the other hand, when second virtual image 302 is projected, as illustrated in FIG. 8, controller 5 moves screen 1 in movement direction X (a direction indicated by arrow X1 or X2). In other words, controller 5 controls drive unit 2 and irradiation unit 3 such that irradiation unit 3 irradiates moving screen 1 with light. Since screen 1 is originally inclined with respect to movement direction X, when screen 1 is located at the hold position, depending on a position on front surface 11 of screen 1 in the longitudinal direction, a difference in distance to projection unit 4 in movement direction X occurs. When screen 1 is moved in movement direction X in synchronization with a change in irradiation position of the light from irradiation unit 3 in the longitudinal direction so as to cancel the difference in distance, the irradiation position of the light from irradiation unit 3 on front surface 11 in screen 1 is unchanged in movement direction X. Accordingly, second image 702 is formed (projected) on screen 1. The "second image" mentioned herein is image 700 formed on front surface 11 or rear surface 12 of screen 1, which is formed along reference plane 503. When second image 702 is projected onto windshield 101 from projection unit 4, user 200 visually recognizes second virtual image 302 projected in front of vehicle 100 through windshield 101.

For example, when the irradiation position of the light from irradiation unit 3 on front surface 11 in screen 1 moves closer to first end part 111 in the longitudinal direction, if screen 1 moves toward first direction X1, a distance from projection unit 4 to the irradiation position in movement direction X becomes substantially constant. In contrast, when the irradiation position of the light from irradiation unit 3 on front surface 11 in screen 1 moves closer to second end part 112 in the longitudinal direction, if screen 1 moves toward second direction X2, the distance from projection unit 4 to the irradiation position in movement direction X becomes substantially constant. With this configuration, second virtual image 302 serving as virtual image 300 is formed on second virtual plane 502 inclined at inclination angle ß (for example, 90 degrees) with respect to optical axis 500.

Accordingly, for example, when irradiation unit 3 irradiates screen 1 moving along second direction X2 with light from first end part 111 toward second end part 112, second virtual image 302 that is visually recognized while being erected upright on road surface 600 at the certain distance from user 200 is projected. As illustrated in FIG. 8, the viewing distance from eye point Pe1 to second virtual image 302 formed at this time becomes substantially equal on a side closer to first end part 111 (a side closer to an upper end) of screen 1 and on a side closer to second end part 112 (a side closer to an lower end) of screen 1. In other words, when viewed from user 200, second virtual image 302 becomes a virtual image whose viewing distance is substantially equal on the side closer to the upper end and on the side closer to the lower side in the vertical direction (the vertical direction in FIG. 2).

In the present exemplary embodiment, a scanning range of irradiation unit 3 in the longitudinal direction is set narrower when second virtual image 302 is formed than when first virtual image 301 is formed. In other words, in image 700 formed on front surface 11 of screen 1, a longitudinal dimension of second image 702 is set smaller than a vertical dimension of first image 701. With this configuration, for example, as illustrated in FIG. 2, a vertical dimension of each second virtual image 302 becomes smaller than a vertical dimension of first virtual image 301 in the view field of user 200.

Figure 9:
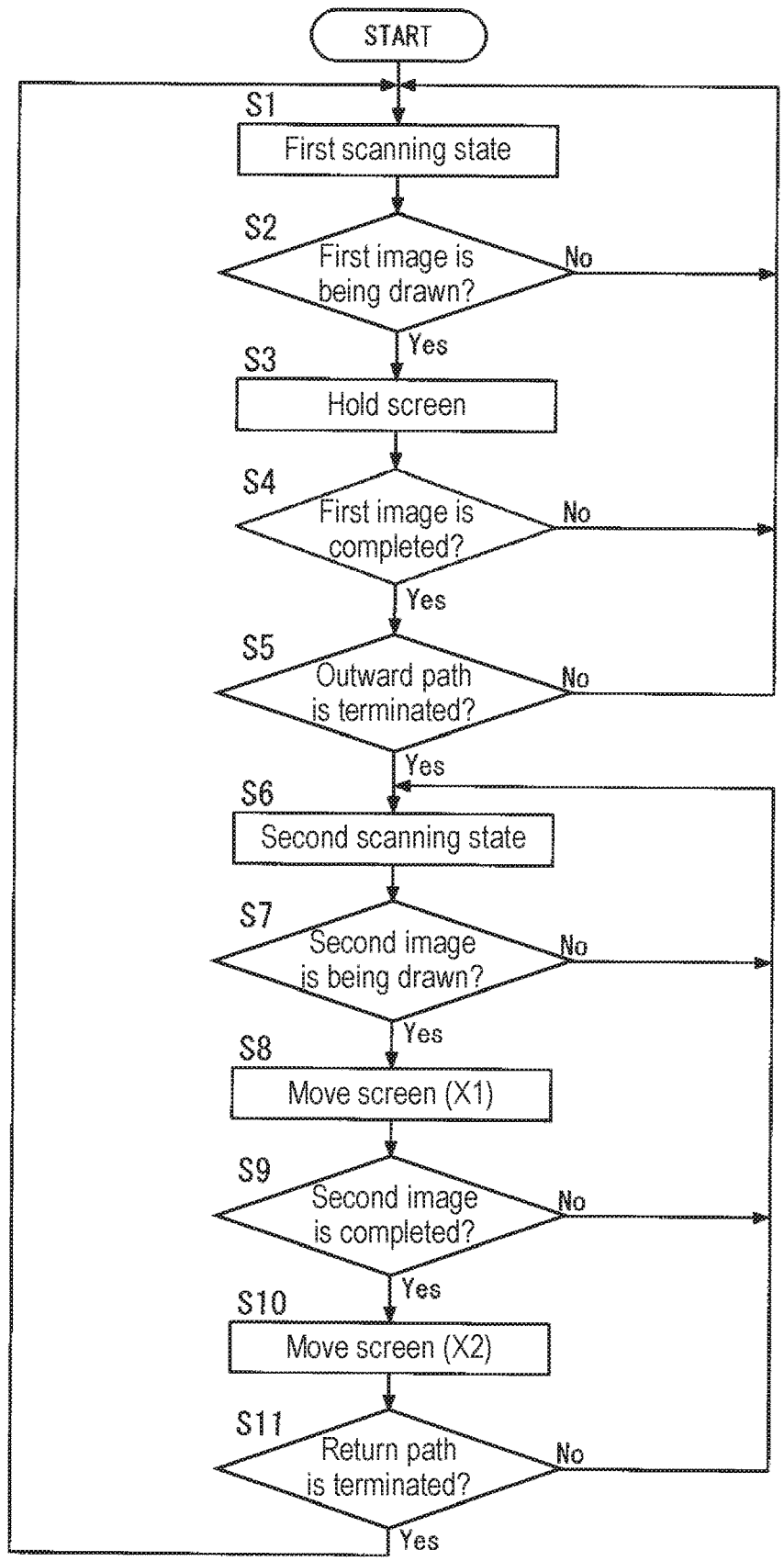
FIG. 9 is a flowchart illustrating an operation example of the display device.

FIG. 9 is a flowchart illustrating an operation example of display device 10 when both first virtual image 301 and second virtual image 302 are projected. Herein, as an example, a case where irradiation unit 3 projects first virtual image 301 in the "outward path" in which the light is scanned from first end part 111 toward second end part 112, and projects second virtual image 302 in the "return path" in which the light is scanned from second end part 112 toward first end part 111 is exemplified.

As illustrated in FIG. 9, when starting a display operation (projection of virtual image 300), display device 10 first performs a process for forming (projecting) first virtual image 301 in the "outward path". In other words, controller 5 controls irradiation unit 3 so as to operate in the first scanning state (S1). This causes irradiation unit 3 to scan (raster-scan) front surface 11 of screen 1 from first end part 111 toward second end part 112. At this time, controller 5 determines whether first image 701 is being drawn each time one scan line is drawn along the lateral direction (S2). When first image 701 is not being drawn (S2: No), controller 5 returns to the operation of process S1 to cause irradiation unit 3 to continue to scan.

In process S2, when first image 701 is being drawn (S2: Yes), controller 5 controls drive unit 2 such that screen 1 is held at the hold position (also referred to as a "reference position") (S3). Controller 5 determines whether first image 701 is completed (S4). When first image 701 is not completed (S4: No), processes S1 to S4 are repeated to draw first image 701. Those processes S1 to S4 correspond to a first process for forming first virtual image 301 in a method for controlling display device 10. In other words, first image 701 is drawn with screen 1 being held at the hold position in the "outward path".

When first image 701 is completed (S4: Yes), controller 5 determines whether the outward path is terminated (the irradiation position reaches second end part 112) (S5). When the outward path is not terminated (S5: No), processes S1 to S5 are repeated. With this configuration, in the "outward path", first image 701 is formed (projected) on screen 1. First image 701 is projected from projection unit 4 onto windshield 101, thereby forming first virtual image 301 extending along road surface 600 in target space 400.

When the outward path is terminated (S5: Yes), display device 10 performs a process for forming (projecting) second virtual image 302 in the "return path". In other words, controller 5 controls irradiation unit 3 so as to operate in a second scanning state (S6). This causes irradiation unit 3 to scan (raster-scan) front surface 11 of screen 1 from second end part 112 toward first end part 111. At this time, controller 5 determines whether second image 702 is being drawn each time one scan line is drawn along the lateral direction (S7). When second image 702 is not being drawn (S7: No), controller 5 returns to the operation of process S6 to cause irradiation unit 3 to continue to scan.

In process S7, when second image 702 is being drawn (S7: Yes), controller 5 controls drive unit 2 so as to move screen 1 along first direction X1 (S8). Controller 5 determines whether second image 702 is completed (S9). When second image 702 is not completed (S9: No), controller 5 repeats processes S6 to S9 to draw second image 702. Those processes S6 to S9 correspond to a second process for forming second virtual image 302 in the method for controlling display device 10. Herein, during a period when second image 702 is being drawn, a movement speed of screen 1 moving along first direction X1 is constant (constant speed) at a prescribed speed. In other words, in the "return path", each time one scan line is drawn along the lateral direction, second image 702 is drawn while moving screen 1 so as to separate from irradiation unit 3 (approach projection unit 4).

When second image 702 is completed (S9: Yes), controller 5 controls drive unit 2 so as to move screen 1 along second direction X2 to return screen 1 to the reference position (S10). Controller 5 then determines whether the return path is terminated (the irradiation position reaches first end part 111) (S11). When the return path is not terminated (S11: No), processes S6 to S11 are repeated. With this configuration, in the "return path", second image 702 is formed (projected) on screen 1. Second image 702 is projected from projection unit 4 onto windshield 101, thereby forming second virtual image 302 being erected upright on road surface 600 at the certain distance from user 200 in target space 400.

When the return path is terminated (S11: Yes), display device 10 returns to the operation of process S1 and performs a process for forming (projecting) first virtual image 301 in the "outward path". Display device 10 repeatedly performs processes S1 to S11 described above while the display operation (the projection of virtual image 300) is continued. With this configuration, first virtual image 301 is formed in target space 400 in the "outward path", and second virtual image 302 is formed in target space 400 in the "return path". As a result, during a period when the irradiation position of the light from irradiation unit 3 reciprocates between first end part 111 and second end part 112 on front surface 11 of screen 1 one time, first virtual image 301 and second virtual image 302 are formed in target space 400. Scanning in the longitudinal direction is performed in irradiation unit 3 relatively fast, so that user 200 visually recognizes as if first virtual image 301 and second virtual image 302 were displayed simultaneously. A frequency of scanning in the longitudinal direction in irradiation unit 3 is, for example, not less than 60 Hz.

Figure 10A:
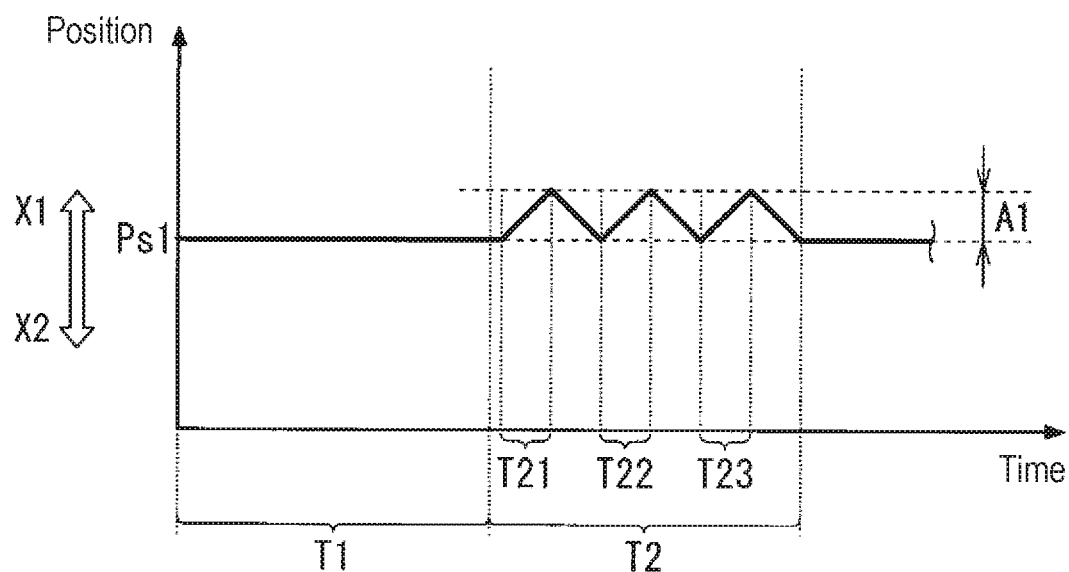
FIG. 10A is a graph illustrating a temporal change of a position of the screen in the display device.
Figure 10B:
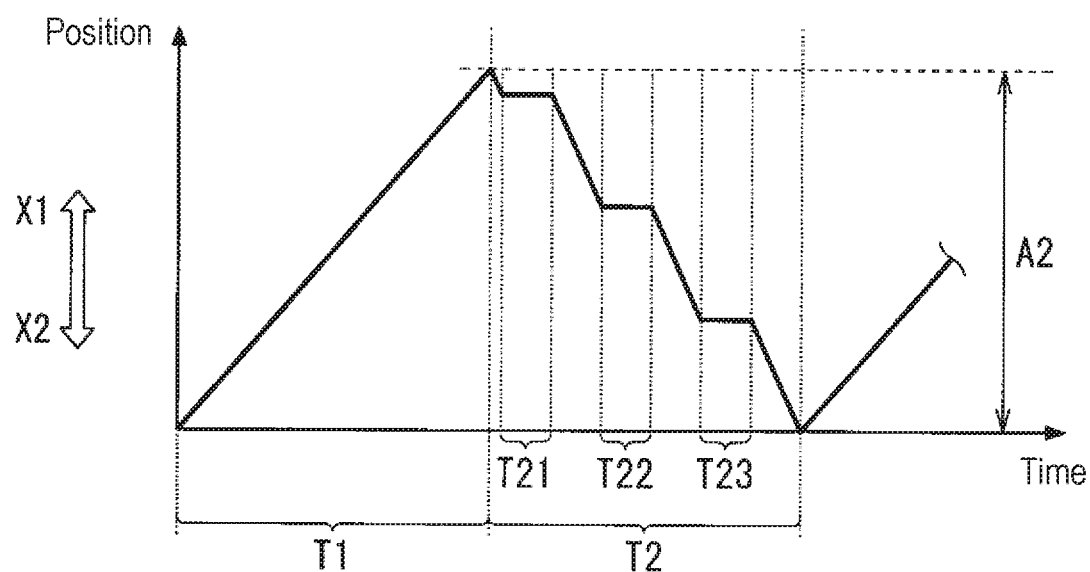
FIG. 10B is a graph illustrating a temporal change of a position of a screen in a comparative example.

FIG. 10A is a graph illustrating a temporal change of a position of screen 1 in movement direction X when display device 10 operates according to the flowchart illustrated in FIG. 9. FIG. 10B is a similar graph of a comparative example in which screen 1 is disposed such that front surface 11 of screen 1 is orthogonal to movement direction X. In FIGS. 10A and 10B, a horizontal axis is a time axis, and the position of screen 1 is indicated along a vertical axis.

As illustrated in FIG. 10A, in period T1 of the "outward path" in which irradiation unit 3 scans screen 1 with the light from first end part 111 toward second end part 112, the position of screen 1 in movement direction X is held at reference position Ps1. In other words, with screen 1 being held at reference position Ps1, first image 701 is formed on screen 1, thereby forming first virtual image 301 in target space 400.

On the other hand, in period T2 of the "return path" in which irradiation unit 3 scans screen 1 with the light from second end part 112 toward first end part 111, the position of screen 1 in movement direction X is changed in synchronization with timing when second image 702 is drawn. In this case, in period T2, each of periods T21, T22, and T23 represents a period when second image 702 is being drawn. In other words, with screen 1 being moved from reference position Ps1 along first direction X1, second image 702 is formed on screen 1, thereby forming second virtual image 302 in target space 400. At this time, a moving speed of screen 1 is constant. Each time second image 702 is formed, screen 1 is moved along second direction X2 to return to reference position Ps1. During periods T21, T22, and T23, the process for forming second image 702 is performed a plurality of times (three times, in this case), thereby projecting forming a plurality (three pieces, in this case) of second virtual images 302 each having a different viewing distance from each other in target space 400 (refer to FIG. 2). In the example in FIG. 10A, in period T21 when second image 702 is formed near second end part 112, the viewing distance of second virtual image 302 is shortest, and in period T23 when second image 702 is formed near first end part 111, the viewing distance of second virtual image 302 is longest.

In contrast, in the comparative example, as illustrated in FIG. 10B, in period T1 of the "outward path", screen 1 is continued to move along first direction X1 to project first virtual image 301. On the other hand, in period T2 of the "return path", screen 1 is stopped only during periods T21, T22, and T23 when second image 702 is being drawn, and screen 1 is continued to move along second direction X2 during periods other than periods T21, T22, and T23.

As described above, in display device 10 according to the present exemplary embodiment, screen 1 only needs to move with amplitude for drawing second image 702, that is, amplitude indicated by "A1" in FIG. 10A. In contrast, in the comparative example, screen 1 needs to move with amplitude for drawing first image 701, that is, amplitude indicated by "A2" in FIG. 10B. Accordingly, display device 10 according to the present exemplary embodiment is different from the comparative example in movement range of screen 1, whereby display device 10 according to the present exemplary embodiment can reduce the movement range of screen 1 to be smaller (A1<A2).

(4) Summary

As described above, display device 10 according to a first aspect includes screen 1, drive unit 2, irradiation unit 3, projection unit 4, and controller 5. Screen 1 includes front surface 11 inclined with respect to reference plane 503. Drive unit 2 moves screen 1 in movement direction X orthogonal to reference plane 503. Irradiation unit 3 irradiates screen 1 with light used for scanning front surface 11 of screen 1. Projection unit 4 receives light that is transmitted through screen 1 and is output from screen 1 along movement direction X as incident light, and forms virtual image 300 in target space 400 by the incident light. Controller 5 controls drive unit 2 and irradiation unit 3. When forming first virtual image 301 serving as virtual image 300 on first virtual plane 501 whose inclination angle α with respect to optical axis 500 of projection unit 4 is smaller than predetermined value γ, controller 5 is configured to fix screen 1 in movement direction X. When forming second virtual image 302 serving as virtual image 300 on second virtual plane 502 whose inclination angle β with respect to optical axis 500 of projection unit 4 is larger than predetermined value γ, controller 5 is configured to move screen 1 in movement direction X.

With this configuration, first virtual image 301 whose inclination angle α with respect to optical axis 500 of projection unit 4 is relatively small, that is, first virtual image 301 whose angle with respect to road surface 600 is shallow when viewed from user 200 is projected with screen 1 being fixed. Therefore, an advantage in which the movement range of screen 1 can be reduced to be small can be obtained, in comparison with the comparative example that moves screen 1 when projecting first virtual image 301. The reduced movement range of screen 1 leads to a decrease in size of drive unit 2 (actuator) for moving screen 1, a reduction in power consumption of drive unit 2, and a reduction in operating sound of drive unit 2, for example.

In display device 10 of a second aspect according to the first aspect, screen 1 further includes first end part 111 and second end part 112 at both ends of front surface 11 in a direction inclined with respect to reference plane 503. Screen 1 is configured such that, when first end part 111 is irradiated with the light of irradiation unit 3, an optical path length (viewing distance) from a drawing point on first virtual image 301 to projection unit 4 is maximized. Screen 1 is configured such that, when second end part 112 is irradiated with the light of irradiation unit 3, the optical path length (viewing distance) from the drawing point on first virtual image 301 to projection unit 4 is minimized.

This configuration can project first virtual image 301 with depth whose viewing distance becomes longer on a side closer to first end part 111, and becomes shorter on a side closer to second end part 112, even when screen 1 is fixed.

In display device 10 of a third aspect according to the first or second aspect, screen 1 further includes first end part 111 and second end part 112 at both ends of front surface 11 in a direction inclined with respect to reference plane 503. An operation state of irradiation unit 3 includes a first scanning state that scans front surface 11 of screen 1 from first end part 111 toward second end part 112, and a second scanning state that scans front surface 11 of screen 1 from second end part 112 toward first end part 111. Controller 5 is configured to synchronize an operation of drive unit 2 with an operation of irradiation unit 3, to form first virtual image 301 or second virtual image 302 in only either the first scanning state or the second scanning state.

With this configuration, first virtual image 301 or second virtual image 302 is formed by only either the first scanning state or the second scanning state. For example, the first exemplary embodiment has described a case where first virtual image 301 is formed only in the first state (outward path), and second virtual image 302 is formed only in the second state (return path). In this case, screen 1 can be fixed at the fixed position in the first scanning state, whereby drive unit 2 is simply controlled.

In display device 10 of a fourth aspect according to any one of the first to third aspects, the scanning range of irradiation unit 3 on front surface 11 of screen 1 in the longitudinal direction inclined with respect to reference plane 503 is narrower when second virtual image 302 is formed than when first virtual image 301 is formed.

With this configuration, since the scanning range of irradiation unit 3 on front surface 11 of screen 1 when second virtual image 302 is formed is narrower, a movement amount of screen 1 when second virtual image 302 is formed can be reduced to be smaller.

A method for controlling display device 10 according to a fifth aspect is a method for controlling display device 10 including screen 1, drive unit 2, irradiation unit 3, projection unit 4, and controller 5. Screen 1 includes front surface 11 inclined with respect to reference plane 503. Drive unit 2 moves screen 1 in movement direction X orthogonal to reference plane 503. Irradiation unit 3 irradiates screen 1 with light used for scanning front surface 11 of screen 1. Projection unit 4 receives light that is transmitted through screen 1 and is output from screen 1 along movement direction X as incident light, and forms virtual image 300 in target space 400 by the incident light. The method for controlling display device 10 includes a first process and a second process. The first process is a process for forming first virtual image 301 serving as virtual image 300 on first virtual plane 501 whose inclination angle α with respect to optical axis 500 of projection unit 4 is smaller than predetermined value γ. The second process is a process for forming second virtual image 302 serving as virtual image 300 on second virtual plane 502 whose inclination angle β with respect to optical axis 500 of projection unit 4 is larger than predetermined value γ. In the first process, screen 1 is fixed in movement direction X. In the second process, screen 1 is moved in movement direction X.

With this method, first virtual image 301 whose inclination angle α with respect to optical axis 500 of projection unit 4 is relatively small, that is, first virtual image 301 whose angle with respect to road surface 600 is shallow when viewed from user 200 is projected with screen 1 being fixed. Therefore, an advantage in which the movement range of screen 1 can be reduced to be small can be obtained, in comparison with the comparative example that moves screen 1 when projecting first virtual image 301. The reduced movement range of screen 1 leads to a decrease in size of drive unit 2 (actuator) for moving screen 1, a reduction in power consumption of drive unit 2, and a reduction in operating sound of drive unit 2, for example.

A moving body (e.g., vehicle 100) according to a sixth aspect includes display device 10 of any one of the first to fourth aspects and the reflective member (e.g., windshield 101) that reflects light from projection unit 4.

With this configuration, first virtual image 301 whose inclination angle α with respect to optical axis 500 of projection unit 4 is relatively small, that is, first virtual image 301 whose angle with respect to road surface 600 is shallow when viewed from user 200 is projected with screen 1 being fixed. Therefore, an advantage in which the movement range of screen 1 can be reduced to be small can be obtained, in comparison with the comparative example that moves screen 1 when projecting first virtual image 301. The reduced movement range of screen 1 leads to a decrease in size of drive unit 2 (actuator) for moving screen 1, a reduction in power consumption of drive unit 2, and a reduction in operating sound of drive unit 2, for example.

The configurations according to the second to fourth aspects are not essential configurations for display device 10, and it is possible to appropriately omit these configurations. In addition, the method for controlling display device 10 according to the fifth aspect can also be applied with various configurations, similar to display device 10 according to the first exemplary embodiment.

(5) Modifications

The first exemplary embodiment is merely one of various exemplary embodiments of the present disclosure. The first exemplary embodiment can be variously modified in accordance with a design, for example, as long as the object of the present disclosure can be achieved. Furthermore, the aspect according to the first exemplary embodiment is not limited to be embodied by a display device alone. The aspect according to the first exemplary embodiment may be embodied by a system, a method for controlling a display device, a computer program, or a recording medium storing a program, for example.

Hereinafter, modifications of the first exemplary embodiment will be listed. The modifications described below can be applied while being combined as appropriate.

Controller 5 may have a configuration for controlling drive unit 2 and irradiation unit 3, and a function for controlling drive unit 2 and a function for controlling irradiation unit 3 may not be integrated. For example, a controller that controls drive unit 2 and a controller that controls irradiation unit 3 may be separately provided and may synchronize with each other.

Display device 10 is not limited to the configuration that simultaneously projects first virtual image 301 and second virtual image 302, and may have a mode for projecting only first virtual image 301 and a mode for projecting only second virtual image 302, for example.

The operation state of irradiation unit 3 may be only either the first scanning state (outward path) or the second scanning state (return path). In this case, first virtual image 301 and second virtual image 302 are formed in either the first scanning state (outward path) or the second scanning state (return path).

Furthermore, in the first exemplary embodiment, the configuration in which first virtual image 301 is formed only in the first scanning state (outward path) and second virtual image 302 is formed only in the second scanning state (return path) has been described, but the present disclosure is not limited to this configuration. For example, first virtual image 301 may be formed only in the second scanning state (return path) and second virtual image 302 may be formed only in the first scanning state (outward path). Alternatively, first virtual image 301 or second virtual image 302 may be formed in both the first scanning state (outward path) and the second scanning state (return path). Furthermore, both first virtual image 301 and second virtual image 302 may be formed in both the first scanning state (outward path) and the second scanning state (return path). In this case, in at least parts of first virtual image 301 and second virtual image 302, if identical virtual image 300 is formed in both the first scanning state (outward path) and the second scanning state (return path), intensity of virtual image 300 can be increased.

The scanning range of irradiation unit 3 on front surface 11 of screen 1 in the longitudinal direction inclined with respect to reference plane 503 may be wider when second virtual image 302 is formed than when first virtual image 301 is formed.

As illustrated in FIG. 2, forming the plurality (three pieces, in this case) of second virtual images 302 each having the different viewing distance from each other in target space 400 is not essential to display device 10. Only single second virtual image 302 may be formed in target space 400.

Screen 1 is not limited to the configuration in which only front surface 11 of screen 1 has the light-diffusing property. For example, only rear surface 12 or both front surface 11 and rear surface 12 may have the light-diffusing property. When rear surface 12 of screen 1 has the light-diffusing property, image 700 is formed on rear surface 12 of screen 1.

Furthermore, display device 10 is not limited to the configuration of forming virtual image 300 in target space 400 set in front of vehicle 100 in the traveling direction. For example, display device 10 may form virtual image 300 on a side portion, rear portion, upper portion and the like in the traveling direction of vehicle 100.

Screen 1 is not only rectilinearly moved in movement direction X. For example, screen 1 may be rotatable so as to change inclination angle θ of front surface 11 with respect to reference plane 503.

Projection unit 4 may include or may not include a relay optical system for forming an intermediate image.

In addition, display device 10 is not limited to the head-up display for use in vehicle 100. For example, display device 10 is also applicable as a display for a moving body other than vehicle 100, the other mobile body including a motorcycle, a train, an aircraft, a construction machine, a vessel, and the like. Moreover, the place of use of display device 10 is not limited to the moving body. For example, display device 10 may be used in an amusement facility. Display device 10 may also be used as a wearable terminal such as a head mounted display (HMD). Furthermore, display device 10 may be used at a medical facility, and may be used as a stationary device.

Second Exemplary Embodiment

Display device 10 according to the present exemplary embodiment is different from display device 10 according to the first exemplary embodiment in control contents of drive unit 2 for moving screen 1. Hereinafter, constituent elements identical to those of the first exemplary embodiment are denoted by like reference signs and explanations thereof will be omitted.

In the present exemplary embodiment, controller 5 controls drive unit 2 so as to reduce rapid acceleration and deceleration of screen 1 in movement direction X. Specifically, controller 5 defines a control pattern of drive unit 2 so as to reduce acceleration imposed on screen 1 to be less than or equal to a prescribed value, upon switching between a state with screen 1 being stopped and a state with screen 1 being moved, and upon switching the direction toward which screen 1 moves.

Figure 11:
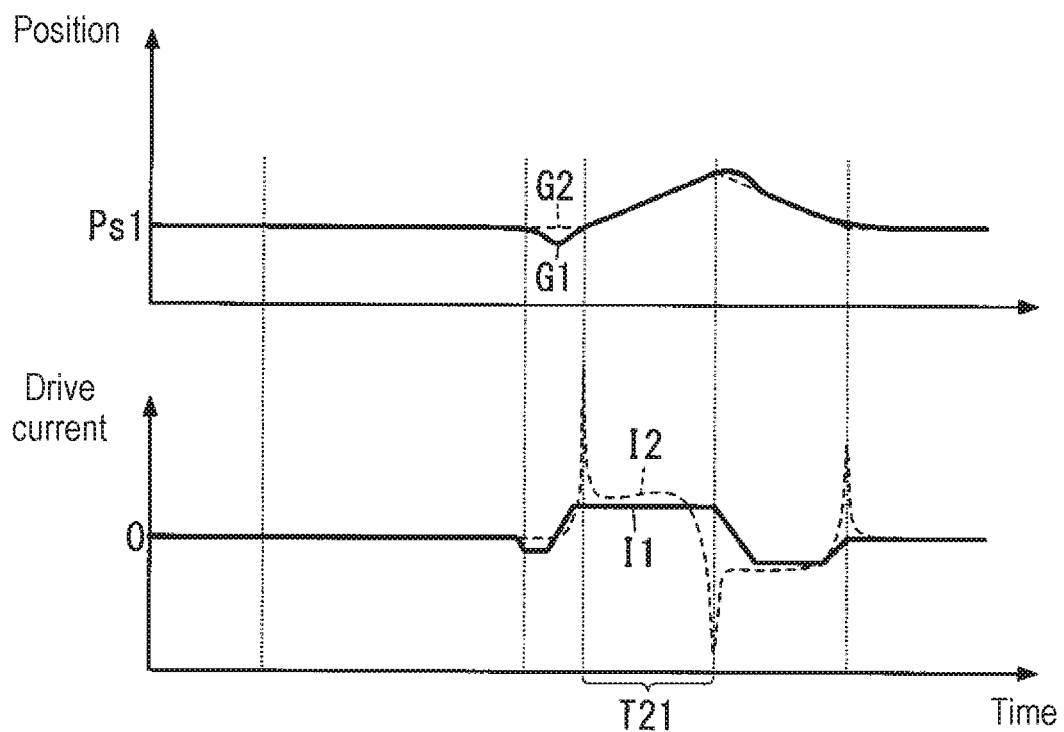
FIG. 11 is a graph illustrating temporal changes of a position of a screen in a display device according to a second exemplary embodiment, and a driving current.

FIG. 11 is a graph illustrating temporal changes of a position of screen 1 in movement direction X, and a drive current of drive unit 2 (equivalent to consuming power) during period T21 (refer to FIG. 10A) for drawing second image 702 and periods before and after period T21. In FIG. 11, a horizontal axis is a time axis, an upper stage indicates the position of screen 1, and a lower stage indicates the drive current.

In the configuration of the first exemplary embodiment, as illustrated with "G2" (broken line) in FIG. 11, screen 1 staying still at reference position Ps1 suddenly starts moving at a prescribed speed from a start point of period T21, and further a movement direction of screen 1 is suddenly switched at an end point of period T21. In addition, when screen 1 returns to reference position Ps1, screen 1 is suddenly stopped. Therefore, in the drive current flowing through drive unit 2, as illustrated with "I2" in FIG. 11, pulse-like high-frequency components are generated at the start point and the end point of period T21 and timing when screen 1 is stopped, in some cases.

In contrast, in a configuration of the present exemplary embodiment, as illustrated with "G1" (solid line) in FIG. 11, by utilizing the periods before and after period T21, rapid acceleration and deceleration of screen 1 are reduced such that the moving speed of screen 1 changes continuously. In other words, controller 5 controls drive unit 2 through the periods before and after period T21 such that the drive current flowing through drive unit 2 has a smooth waveform as illustrated with "I1" (solid line) in FIG. 11. This can reduce the acceleration imposed on screen 1 to be less than or equal to the prescribed value, while maintaining the moving speed of screen 1 during period T21 at a prescribed speed. In addition, also when screen 1 returns to reference position Ps1, sudden stop of screen 1 can be avoided by gradually decelerating screen 1.

As described above, display device 10 according to the present exemplary embodiment can reduce the acceleration imposed on screen 1 to be less than or equal to the prescribed value, and as a result, generation of the pulse-like high-frequency components can be reduced in the drive current of drive unit 2. This can provide advantages in which impact imposed on screen 1 and drive unit 2 is lessened, and generation of noise due to the high-frequency components can be reduced.

The control contents of drive unit 2 described in the second exemplary embodiment is merely an example. For example, controller 5 may control drive unit 2 so as to change the position of screen 1 in movement direction X in a sine wave shape along time series.

The configuration of display device 10 according to the second exemplary embodiment (including the modifications) can be combined with the configuration of display device 10 according to the first exemplary embodiment (including the modifications) as appropriate.

The drawings illustrated in each exemplary embodiment described above are merely conceptual diagrams, and are different in shapes, sizes, and positional relationships from actual display device 10.

INDUSTRIAL APPLICABILITY

The present disclosure is useful as a display device, a method for controlling the display device, and a moving body including the display device.

REFERENCE MARKS IN THE DRAWINGS

10: display device
1: screen
11: front surface
111: first end part
112: second end part
12: rear surface
2: drive unit
3: irradiation unit
31: light source
32: scanner
321: mirror unit
322: first lens
323: second lens
4: projection unit
41: magnifying lens
42: first mirror
43: second mirror
5: controller
100: vehicle (moving body)
101: windshield (reflective member)
102: dashboard
104: vehicle drive unit
105: driving source
106: driving wheel
109: body
200: user
300: virtual image
301: first virtual image
302: second virtual image
400: target space
500: optical axis
501: first virtual plane
502: second virtual plane
503: reference plane
600: road surface
700: image
701: first image
702: second image
B1: luminescent spot
Pe1: eye point
X (arrow X1-X2 in FIG. 3): movement direction
X1: first direction
X2: second direction

The invention claimed is:

1. A display device comprising:
  a screen including a surface inclined with respect to a reference plane;
  a driver that moves the screen in a movement direction orthogonal to the reference plane;
  an irradiator that irradiates the screen with light used for scanning the surface of the screen;
  a projector that receives light as incident light, the light having been transmitted through the screen and outputted from the screen along the movement direction from the screen, and the projector forming a virtual image in a target space by forming the incident light onto a reflective member to be reflected; and a controller that controls the driver and the irradiator, wherein the controller is configured to hold the screen at a reference position along the movement direction and to irradiate the screen that is held at the reference position when a first virtual image serving as the virtual image is formed on a first virtual plane whose inclination angle with respect to an optical axis of the projector is smaller than a predetermined value, the predetermined value being with respect to the optical axis, and the controller is configured to move the screen in the movement direction and to irradiate the screen that is moving in the movement direction when a second virtual image serving as the virtual image is formed on a second virtual plane whose inclination angle with respect to the optical axis of the projector is larger than the predetermined value.

2. The display device according to claim 1, wherein the screen further includes a first end part and a second end part at respective ends of the surface in a direction inclined with respect to the reference plane, when the first end part is irradiated with light of the irradiator, an optical path length from a drawing point on the first virtual image to the projector is maximized, and When the second end part is irradiated with the light of the irradiator, the optical path length from the drawing point on the first virtual image to the projector is minimized.

3. The display device according to claim 1, wherein the screen further includes a first end part and a second end part at respective ends of the surface in a direction inclined with respect to the reference plane, an operation state of the irradiator includes a first scanning state that scans the surface of the screen from the first end part toward the second end part, and a second scanning state that scans the surface of the screen from the second end part toward the first end part, and the controller is configured to synchronize an operation of the driver with an operation of the irradiator, to form the first virtual image or the second virtual image in only either the first scanning state or the second scanning state.

4. The display device according to claim 1, wherein a scanning range of the irradiator on the surface of the screen in a vertical direction inclined with respect to the reference plane is narrower when the second virtual image is formed than when the first virtual image is formed.

5. A method for controlling a display device including a screen including a surface inclined with respect to a reference plane, a driver that moves the screen in a movement direction orthogonal to the reference plane, an irradiator that irradiates the screen with light used for scanning the surface of the screen, and a projector that receives light as incident light, the light having been transmitted through the screen and outputted from the screen along the movement direction from the screen, and the projector forming a virtual image in a target space by the incident light, the method comprising:

a first process for forming a first virtual image serving as the virtual image on a first virtual plane whose inclination angle with respect to an optical axis of the projector is smaller than a predetermined value, the predetermined value being with respect to the optical axis; and a second process for forming a second virtual image serving as the virtual image on a second virtual plane whose inclination angle with respect to the optical axis of the projector is larger than the predetermined value, wherein in the first process, the screen is held at a reference position along the movement direction and the screen that is held at the reference position is irradiated, and in the second process, the screen is moved in the movement direction and the screen that is moving in the movement direction is irradiated.

6. A moving body comprising:

the display device according to claim 1; and the reflective member that reflects light from the projector.

7. The display device according to claim 2, wherein an operation state of the irradiator includes a first scanning state that scans the surface of the screen from the first end part toward the second end part, and a second scanning state that scans the surface of the screen from the second end part toward the first end part, and the controller is configured to synchronize an operation of the driver with an operation of the irradiator, to form the first virtual image or the second virtual image in only either the first scanning state or the second scanning state.

8. The display device according to claim 1, wherein the first virtual image indicates a traveling direction of a vehicle.

9. The display device according to claim 1, wherein the second virtual image indicates a distance to a front vehicle or a pedestrian.

* * * * *